(12) United States Patent
Rieke et al.

(10) Patent No.: US 9,074,791 B2
(45) Date of Patent: Jul. 7, 2015

(54) GAS FURNACE CONDENSATE COLLECTOR BOX

(75) Inventors: Larry D. Rieke, Zionsville, IN (US); Jayashanger Goundiah Ramasamy, Indianapolis, IN (US); Brian A. Reeves, Indianapolis, IN (US)

(73) Assignee: CARRIER CORPORATION, Farmington, CT (US)

( * ) Notice: Subject to any disclaimer, the term of this patent is extended or adjusted under 35 U.S.C. 154(b) by 806 days.

(21) Appl. No.: 13/267,050

(22) Filed: Oct. 6, 2011

(65) Prior Publication Data

US 2012/0090591 A1   Apr. 19, 2012

Related U.S. Application Data

(60) Provisional application No. 61/393,461, filed on Oct. 15, 2010.

(51) Int. Cl.
| F24H 3/06 | (2006.01) |
| F28F 9/02 | (2006.01) |
| F28F 17/00 | (2006.01) |
| F24H 3/08 | (2006.01) |
| F24H 8/00 | (2006.01) |

(52) U.S. Cl.
CPC .............. *F24H 3/087* (2013.01); *F28F 17/005* (2013.01); *F24H 8/006* (2013.01); *Y02B 30/106* (2013.01)

(58) Field of Classification Search
CPC .... F24H 8/006; Y02B 30/106; Y02B 30/102; F28F 17/005; F23J 2900/13004
USPC ................................ 126/110 A, 85 R, 116 R
See application file for complete search history.

(56) References Cited

U.S. PATENT DOCUMENTS

| 4,603,680 | A |  | 8/1986 | Dempsey et al. |  |
| 4,892,045 | A | * | 1/1990 | Schumacher | 110/203 |
| 4,899,726 | A |  | 2/1990 | Waterman |  |
| 5,046,478 | A |  | 9/1991 | Clawson |  |
| 5,178,124 | A |  | 1/1993 | Lu et al. |  |
| 5,257,904 | A |  | 11/1993 | Sullivan |  |
| 5,322,050 | A |  | 6/1994 | Lu |  |
| 5,341,795 | A |  | 8/1994 | Chou et al. |  |
| 5,379,749 | A | * | 1/1995 | Rieke et al. | 126/110 R |
| 5,379,751 | A |  | 1/1995 | Larsen et al. |  |
| 5,443,364 | A |  | 8/1995 | Mistry et al. |  |
| 5,547,232 | A |  | 8/1996 | Waterman |  |
| 5,582,159 | A | * | 12/1996 | Harvey et al. | 126/110 R |
| 7,036,498 | B2 | * | 5/2006 | Riepenhoff et al. | 126/110 R |
| 8,056,553 | B2 | * | 11/2011 | Khan | 126/116 R |
| 2003/0070672 | A1 |  | 4/2003 | Ho et al. |  |

* cited by examiner

*Primary Examiner* — David J Laux
(74) *Attorney, Agent, or Firm* — Cantor Colburn LLP

(57) ABSTRACT

A condensate collector box includes a furnace mounting plate having a first edge portion, a second edge portion that extends from the first edge portion, at least one vent drain channel that extends along one of the first and second edge portions, and a heat exchanger condensate collection area. The condensate collector box also includes an inducer fan mounting member having a first surface and opposing second surface arranged upon the furnace mounting plate to form a condensate collection zone. The inducer fan mounting member includes at least one inducer fan drain passage that is fluidly connected to the at least one vent drain channel.

10 Claims, 3 Drawing Sheets

GAS FURNACE CONDENSATE COLLECTOR BOX

CROSS REFERENCE TO RELATED APPLICATION

This application is a Non-Provisional Application of U.S. Provisional Application Ser. No. 61/393,461 filed Oct. 15, 2010.

BACKGROUND OF THE INVENTION

Exemplary embodiments pertain to the art of gas furnace systems and, more particularly, to a condensate collector box for a gas furnace system.

Gas furnace systems burn a gas fuel to generate heat. Exhaust gases generated by burning the fuel are passed through a chimney or flue and discharged to, in most cases, atmosphere. In the flue, the exhaust gases begin to cool further and form a liquid condensate. It is desirable to remove the liquid condensate from the flue in order to minimize flue blockage, diminished inducer fan performance, diminished performance of other components, and/or rusting and other corrosion effects on portions of the gas furnace. Condensate flows back from the flue into an inducer fan exist and is collected with a pipe tee or drain channels formed in a housing of the inducer fan. The condensate is then passed through elastomeric piping to a condensate trap or drain.

BRIEF DESCRIPTION OF THE INVENTION

Disclosed is a condensate collector box including a furnace mounting plate having a first edge portion, a second edge portion that extends from the first edge portion, at least one vent drain channel that extends along one of the first and second edge portions, and a heat exchanger condensate collection area. The condensate collector box also includes an inducer fan mounting member having a first surface and opposing second surface arranged upon the furnace mounting plate to form a condensate collection zone. The inducer fan mounting member includes at least one inducer fan drain passage that is fluidly connected to the at least one vent drain channel.

Also disclosed is a gas furnace system including a housing having a heat exchanger. A condensate collector box is operatively coupled to the heat exchanger. The condensate collector box includes a furnace mounting plate having a first edge portion, a second edge portion that extends from the first edge portion, at least one vent drain channel that extends along one of the first and second edge portions, and a heat exchanger condensate collection area. The condensate collector box also includes an inducer fan mounting member having a first surface and opposing second surface arranged upon the furnace mounting plate to form a condensate collection zone. At least one inducer fan drain passage is formed in the inducer fan mounting member. The at least one inducer fan drain passage is fluidly connected to the at least one vent drain channel. An inducer fan is arranged upon the inducer fan mounting member.

BRIEF DESCRIPTION OF THE DRAWINGS

The following descriptions should not be considered limiting in any way. With reference to the accompanying drawings, like elements are numbered alike.

DETAILED DESCRIPTION OF THE INVENTION

A detailed description of one or more embodiments of the disclosed apparatus and method are presented herein by way of exemplification and not limitation with reference to the Figures.

Figure 1:
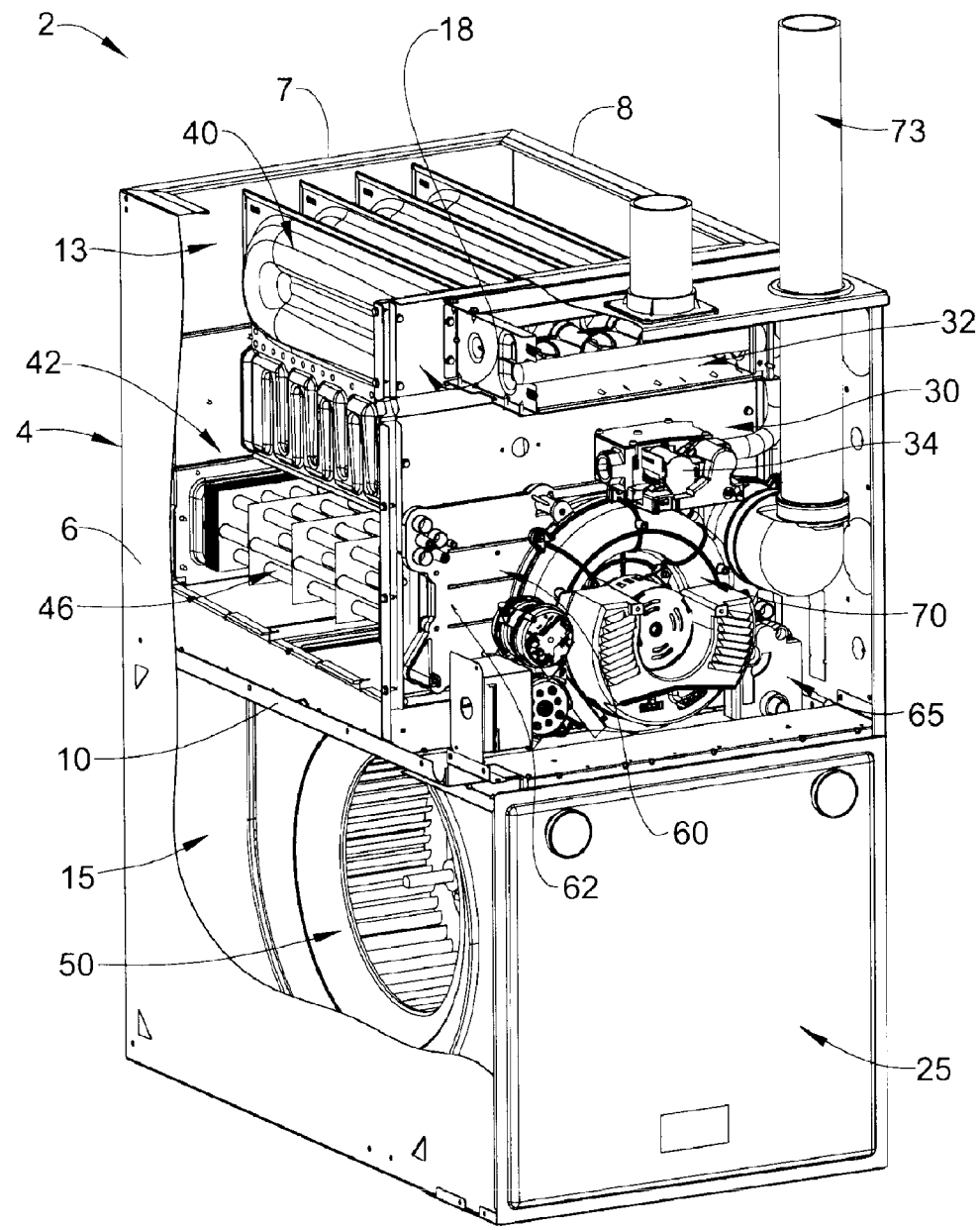
FIG. 1 is a left perspective view of a gas furnace system including a condensate collector box in accordance with an exemplary embodiment.
Figure 2:
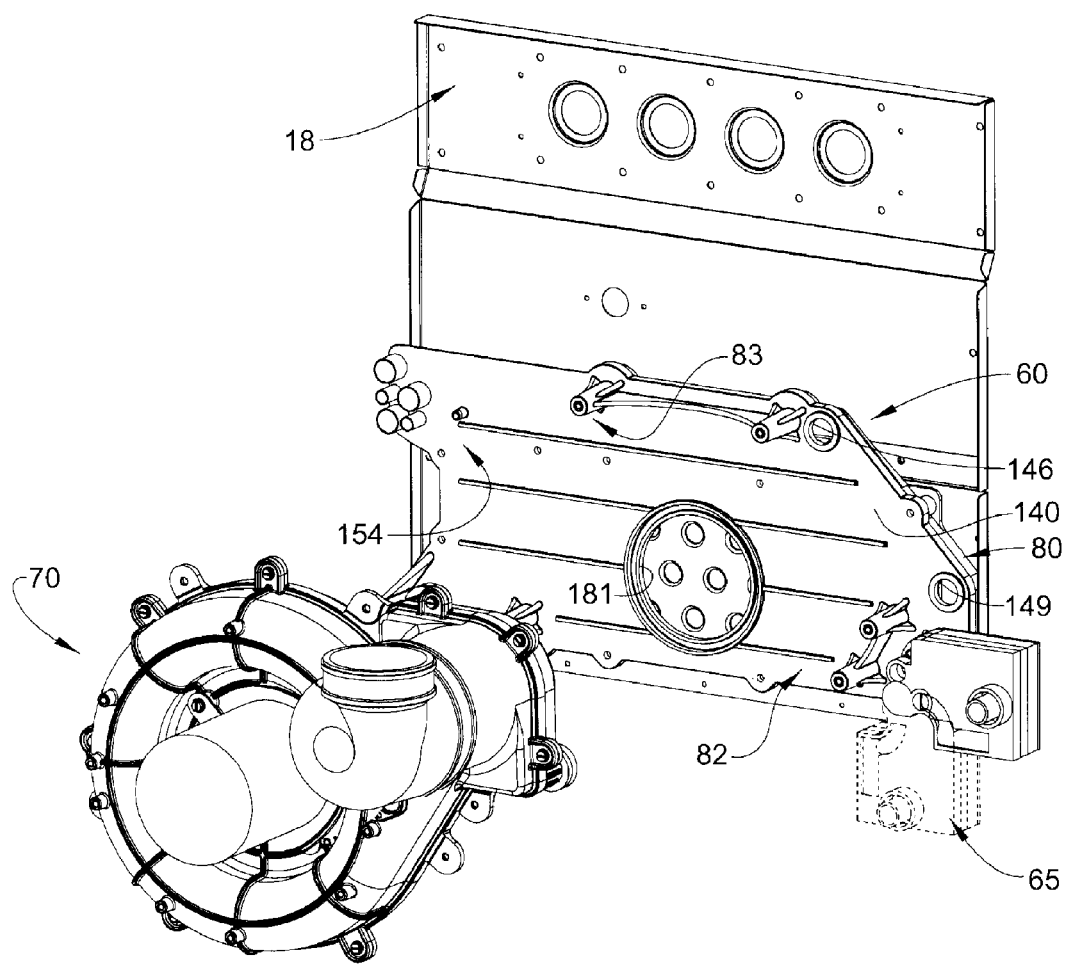
FIG. 2 is a partial perspective view of the gas furnace system of FIG. 1 with an inducer fan assembly removed to exposed the condensate collector box.

With reference to FIGS. 1 and 2, a gas furnace system in accordance with an exemplary embodiment is indicated generally at 2. Gas furnace system 2 includes a housing 4 having a plurality of exterior walls 6-8 and an interior dividing wall 10 that forms a heat exchange portion 13 and a blower portion 15. Heat exchange portion 13 includes a component support wall 18 which, as will be discussed more fully below, provides structure for mounting various components of gas furnace system 2. Housing 4 is also shown to include an access panel 25 that provides access to blower portion 15 and another access panel (not shown) that provides access to heat exchange portion 13.

Gas furnace system 2 is also shown to include a burner assembly 30 mounted to component support wall 18. Burner assembly 30 includes a burner box 32 and a gas valve 34. Burner assembly 30 combusts a fuel, in the form of gas, to generate heat used to condition a comfort zone such as living spaces, work spaces and the like. As will be discussed more fully below, products of combustion or exhaust gases generated by the burning of the fuel are expelled to ambient. In the Exemplary embodiment shown, burner assembly 30 is operatively connected to a primary heat exchanger 40 arranged within heat exchange portion 13. Primary heat exchanger 40 is operatively coupled to a condensing heat exchanger 42. Condensing heat exchanger 42 includes a plurality of heat exchange members 46. With this arrangement, a blower motor assembly 50 arranged within blower portion 15 draws in air from a space to be heated. The air is guided over primary heat exchanger 40, and heat exchange members 46 of condensing heat exchanger 42. The air is heated and then re-introduced into the space.

During operation gas furnace system 2, moisture from the products of combustion condenses condensing heat exchanger 42. This moisture collected and passed on to an external drain (not shown). The moisture is guided to a condensate collector box 60. Condensate collector box 60 is secured to component support wall 18. The moisture is collected in condensate collector box 60 and passed to a condensate trap 65 and on to the external drain. Gas furnace system 2 further includes an inducer fan assembly 70 mounted to condensate collection box 60. Inducer fan assembly 70 creates an air flow that establishes a draft which draws the products of combustion from burner box 32 through heat exchanger 40 and heat exchange members 46 of condensing heat exchanger 42. More specifically, inducer fan assembly 70 produces a pressure rise and flow rate to achieve a desired combustion performance while overcoming flow losses within gas furnace system 2. The products of combustion are then exhausted through a flue vent 73.

Figure 3:
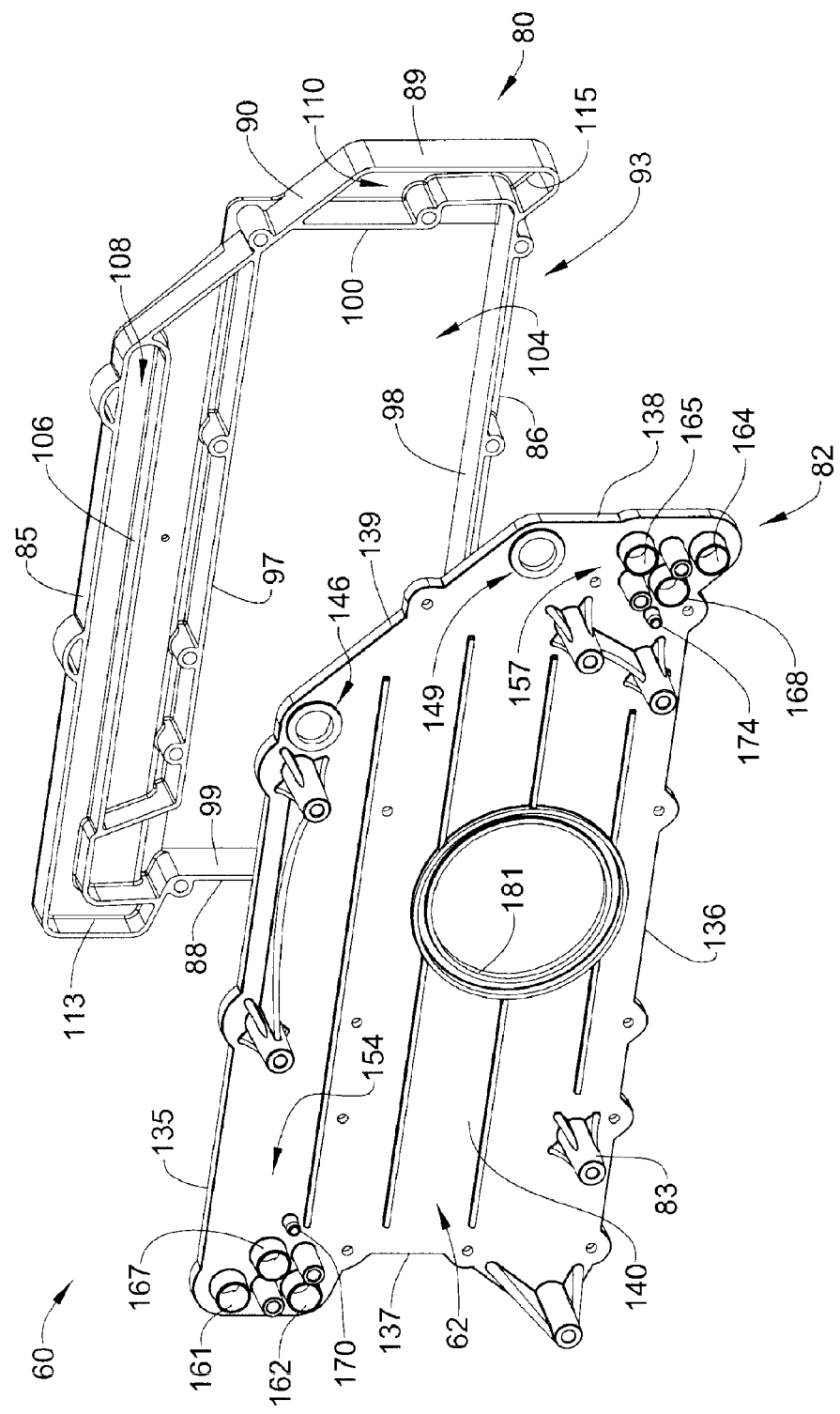
FIG. 3 is an exploded view of the condensate collector box of FIG. 1.

As best shown in FIG. 3, condensate collection box 60 includes a furnace mounting plate 80 that is joined to an inducer fan mounting plate 82 that includes a plurality of inducer fan mounting members, one of which is indicated at 83. Furnace mounting plate 80 includes a first edge portion 85 and an opposing second edge portion 86. First and second opposing edge portion 85 and 86 are joined by third and fourth opposing edge portions 88 and 89, and a fifth, angled, edge portion 90. Furnace mounting plate is also shown to include a heat exchanger condensate collection area 93 having a plurality of side sections 97-100 that collectively define an opening 104. Opening 104 leads to heat exchange portion 13. Condensate forming within heat exchange portion 13 enters condensate collection box 60 through opening 104. First edge 85 and a side wall 106 form a first vent drain channel 108. Similarly, fourth edge portion 89 and side section 100 include raised sections (also not separately labeled) that define a second vent drain channel 110. As will become more fully evident below, first and second vent drain channels include corresponding condensate collection zones 113 and 115 respectively.

In further accordance with the exemplary embodiment, inducer fan mounting plate 82 includes first and second opposing edges 135 and 136 that are joined by third, fourth opposing edges 137 and 138, and a fifth, angled, edge 139. Edges 135-139 collectively define a first surface 140 and an opposing second surface (not separately labeled). In the exemplary embodiment shown, inducer fan mounting plate 82 includes a first inducer fan drain element 146 arranged at an intersection of first and fifth edges 135 and 139. A second inducer fan drain element 149 is arranged at an intersection of fifth and fourth edges 139 and 138. As will be discussed more fully below, first and second inducer fan drain elements 146 and 149 provide a pathway from inducer fan assembly 70 into respective ones of 146, 149 first and second vent drain channels 108 and 110. The particular vent drain element that is in use for any particular arrangement depends upon the desired orientation of gas furnace system 2.

Inducer fan mounting plate 82 is further shown to include a first condensate trap mounting element 154 arranged at an intersection of first and third edges 135 and 137. A second condensate trap mounting element 157 is arranged at an intersection of second and fourth edges 136 and 138. First and second condensate trap mounting elements 154 and 157 provide structure for attaching condensate vent trap. In a manner similar to that described above, the particular condensate trap mounting element 154, 157 in use for a particular arrangement depends upon the orientation of gas furnace system 2. In order to provide a pathway from each vent drain channel 108 and 110, inducer fan mounting plate 82 includes a first and second condensate trap drain openings 161 and 162 arranged at first condensate trap mounting element 154 and third and fourth condensate trap drain openings 164 and 165 arranged at second condensate trap mounting element 157. Inducer fan mounting plate 82 also includes a first heat exchanger drain opening 167 arranged at first condensate trap mounting element 154 and a second heat exchanger drain opening 168 arranged at second condensate trap mounting element 157. Inducer fan mounting plate 82 is also shown to include first and second vent condensate trap pressure taps 170 and 174 arranged at first and second condensate trap mounting elements 154 and 157 respectively, and an inducer fan opening 181.

Condensate collector box 60 provides for multiple installation orientations for gas furnace system 2. That is, gas furnace system 2 may be installed in an upflow, downflow, horizontal left, or horizontal right furnace orientation with right, left, or top vent orientations in each furnace orientation. Condensate trap 65 is mounted to inducer fan mounting plate 82 at a desired one of condensate trap mounting elements 154 and 157 and, once in place, a desired flow path for condensate is established. That is, regardless of the particular orientation, vent condensate flows through inducer fan drain elements 146 or 149, into condensate collector box 60 and onto condensate trap 65.

More specifically, in for example, an upflow or horizontal right orientation, condensate forming in heat exchange portion 13 flows condensate collection are 93 and passes through condensate trap opening 164 to trap. Condensate forming within flue vent 73 passes from inducer fan 70, through inducer fan drain element 149 and flows into second vent drain channel 110. The condensate collecting in second vent drain channel 110 flows from collection zone 115, through condensate drain trap opening 164 and into condensate drain trap 65 mounted to condensate drain trap mounting element 157. The condensate collecting in condensate drain trap 65 then flows through tubing (not shown) to an external drain. Pressure tap 174 provides signals to a controller (not separately labeled) or a pressure switch (not shown) that represent condition information for the condensate trap. For example, an increase in pressure may indicate a clog in the condensate drain system (tap, trap or external drain line).

At this point it should be understood that the exemplary embodiments provide a condensate collection box that eliminates the need for flexible tubing that must be relocated and/or re-routed depending upon an installation orientation. By elimination the need for flexible tubing, the exemplary embodiments also eliminate various maintenance and installation issues such as cracked tubing, kinked tubing, sagging at condensate collection zones and the like. The gas furnace system in accordance with the exemplary embodiment can be easily modified in the field to change from an initial configuration to a desired configuration without the need for substantial reconstruction.

While the invention has been described with reference to an exemplary embodiment or embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the claims.

What is claimed is:

1. A condensate collector box comprising:
a furnace mounting plate including a first edge portion, a second edge portion extending from the first edge portion, a third edge portion extending from the first edge portion opposite the second edge portion, a first vent drain channel extending along the first edge portion from the second edge portion to the third edge portion and a second vent drain channel extending along the second edge portion, and a heat exchanger condensate collection area defined inwardly of the first and second vent drain channels; and
an inducer fan mounting member having a first surface and opposing second surface arranged upon the furnace mounting plate to form a condensate collection zone, and a first inducer fan drain passage formed on the inducer fan mounting member fluidically connected to the first vent drain channel and a second inducer fan drain passage formed on the inducer fan mounting member and fluidically connected with the second vent drain channel, wherein the inducer fan mounting member includes a first condensate trap mounting element including a condensate trap drain fluidly connected to the first vent drain channel, and a second condensate trap mounting element including a condensate trap drain fluidly connected to the second vent drain channel.

2. The condensate collector box according to claim 1, further comprising: an inducer fan opening extending through the inducer fan mounting member, the inducer fan opening registering with the heat exchanger condensate collection area.

3. The condensate collector box according to claim 1, further comprising: a condensate trap mounted to one of the first and second condensate trap mounting members on the inducer fan mounting member.

4. The condensate collector box according to claim 1, wherein the condensate trap is mounted directly to the one of the first and second condensate trap mounting members.

5. The condensate collector box according to claim 1, wherein the first vent drain channel is fluidically isolated from the second vent drain channel.

6. A gas furnace system including:
a housing including a heat exchanger;
a condensate collector box operatively coupled to the heat exchanger, the condensate collector box including a furnace mounting plate having a first edge portion, a second edge portion extending from the first edge portion, a third edge portion extending from the first end portion opposite the second edge portion, a first vent drain channel extending along the first edge portion from the second edge portion to the third edge portion and a second vent drain channel extending along the second edge portion, and a heat exchanger condensate collection area, and an inducer fan mounting member having a first surface and opposing second surface arranged upon the furnace mounting plate to form a condensate collection zone, and a first inducer fan drain passage formed on the inducer fan mounting member fluidically connected to the first vent drain channel and a second inducer fan drain passage member formed on the inducer fan mounting member fluidically connected to the second vent drain channel, wherein the inducer fan mounting member includes a first condensate trap mounting element including a condensate trap drain fluidly connected to the first vent drain channel, and a second condensate trap mounting element including a condensate trap drain fluidly connected to the second vent drain channel; and
an inducer fan arranged upon the inducer fan mounting member.

7. The gas furnace system according to claim 6, wherein the inducer fan mounting member includes an inducer fan opening extending therethrough, the inducer fan opening registering with the heat exchanger condensate collection area.

8. The gas furnace system according to claim 6, further comprising: a condensate trap mounted to one of the first and second condensate trap mounting members on the inducer fan mounting member.

9. The gas furnace system according to claim 8, wherein the condensate trap is mounted directly to the one of the first and second condensate trap mounting members.

10. The gas furnace system according to claim 6, wherein the first vent drain channel is fluidically isolated from the second vent drain channel.

\* \* \* \* \*